United States Patent
Um et al.

(10) Patent No.: US 12,494,180 B2
(45) Date of Patent: Dec. 9, 2025

(54) DISPLAY PANEL AND DISPLAY TERMINAL AND METHOD OF MANUFACTURING DISPLAY PANEL

(71) Applicants: Huizhou China Star Optoelectronics Display Co., Ltd., Huizhou (CN); TCL China Star Optoelectronics Technology Co., Ltd., Shenzhen (CN)

(72) Inventors: Yoonsung Um, Huizhou (CN); Kaili Qu, Huizhou (CN); Jing Liu, Huizhou (CN); Chuwei Liang, Huizhou (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/623,910

(22) PCT Filed: Oct. 27, 2021

(86) PCT No.: PCT/CN2021/126750
§ 371 (c)(1),
(2) Date: Dec. 30, 2021

(87) PCT Pub. No.: WO2023/056672
PCT Pub. Date: Apr. 13, 2023

(65) Prior Publication Data
US 2024/0428748 A1    Dec. 26, 2024

(30) Foreign Application Priority Data
Oct. 9, 2021  (CN) .......................... 202111175070.7

(51) Int. Cl.
*G09G 3/36* (2006.01)
*G02F 1/1362* (2006.01)
*G02F 1/1368* (2006.01)

(52) U.S. Cl.
CPC ............. *G09G 3/36* (2013.01); *G09G 3/3611* (2013.01); *G02F 1/136286* (2013.01);
(Continued)

(58) Field of Classification Search
CPC ...... G09G 3/36; G09G 3/3611; G09G 3/3614; G09G 2300/0426; G09G 2300/0452; G09G 2320/0209; G02F 1/136286; G02F 1/1368
See application file for complete search history.

(56) References Cited

U.S. PATENT DOCUMENTS

2014/0111406 A1\*  4/2014  Wang ................... G09G 3/3233
345/77
2016/0131954 A1\*  5/2016  Li ........................... G09G 3/36
349/33
(Continued)

FOREIGN PATENT DOCUMENTS

CN    101399028    4/2009
CN    101997008    3/2011
(Continued)

OTHER PUBLICATIONS

English translation for (Cn 111142298A), Zhenzhou (Year: 2020).\*
(Continued)

*Primary Examiner* — William Boddie
*Assistant Examiner* — Saifeldin E Elnafia (57) ABSTRACT

The present application provides a display panel, a display terminal, and a method of manufacturing a display panel. The display panel includes a control unit and a sub-pixel unit array. The sub-pixel unit array includes at least one or more sub-pixel groups, and each sub-pixel groups includes at least two columns of the sub-pixel units. Each data line group includes at least two data lines. Each data line group corresponds to one of the sub-pixel groups, and each data
(Continued)

line group is arranged on any column of the sub-pixel units of the corresponding sub-pixel group.

20 Claims, 7 Drawing Sheets

(52) U.S. Cl.
CPC .......... *G02F 1/1368* (2013.01); *G09G 3/3614* (2013.01); *G09G 2300/0426* (2013.01); *G09G 2300/0452* (2013.01); *G09G 2320/0209* (2013.01)

(56) References Cited

U.S. PATENT DOCUMENTS

| | | |
|---|---|---|
| 2018/0059469 A1 | 3/2018 | Kim et al. |
| 2020/0111849 A1 | 4/2020 | He et al. |
| 2020/0118511 A1* | 4/2020 | Chen .................. G09G 3/20 |

FOREIGN PATENT DOCUMENTS

| | | |
|---|---|---|
| CN | 109164653 | 1/2019 |
| CN | 109634012 | 4/2019 |
| CN | 110764329 | 2/2020 |
| CN | 110888271 | 3/2020 |
| CN | 111142298 | 5/2020 |
| CN | 111308811 | 6/2020 |
| CN | 113325644 | 8/2021 |

OTHER PUBLICATIONS

English translation for (CN 109164653A), Lizhi (Year: 2019).*
English translation for (CN 109634012A), Zhang. (Year: 2019).*
International Search Report Dated May 25, 2022 From the International Searching Authority Re. Application No. PCT/CN2021/126750 and Its Translation Into English. (16 Pages).
Notification of Office Action and Search Report Dated Mar. 31, 2023 From the State Intellectual Property Office of the People's Republic of China Re. Application No. 202111175070.7 and Its Translation Into English. (30 Pages).

* cited by examiner

FIG. 1

(Prior Art)

(Prior Art)

DISPLAY PANEL AND DISPLAY TERMINAL AND METHOD OF MANUFACTURING DISPLAY PANEL

RELATED APPLICATIONS

This application is a National Phase of PCT Patent Application No. PCT/CN2021/126750 having International filing date of Oct. 27, 2021, which claims the benefit of priority of Chinese Patent Application No. 202111175070.7 filed on Oct. 9, 2021. The contents of the above applications are all incorporated by reference as if fully set forth herein in their entirety.

FIELD AND BACKGROUND OF THE INVENTION

The present application relates to the field of display technology, in particular to a display panel, a display terminal, and a method of manufacturing a display panel.

In the related art, a one gate and one data line (1G1D) pixel driving architecture is used to drive the display panel for displaying. For example, in a display panel with a resolution of 8K, a plurality of sub-pixel units arranged in rows and columns are provided to form an array of sub-pixel units. A Gate line is arranged on one side of each row of the sub-pixel units, and each row of the sub-pixel units is connected to a corresponding gate line. A data line is arranged on one side of each column of the sub-pixel units, and each column of the sub-pixel units is connected to a corresponding data line. Multiple gate lines can scan each row of the sub-pixel units row by row, thereby controlling whether the data signal on the data line is loaded into the corresponding sub-pixel unit, so as to realize the image display of the display panel.

However, in the 1G1D pixel driving architecture adopted in the related art, since the shielding electrode is provided above the data line, not only the aperture ratio of the pixel is low, but the transmittance of the display panel is also low. Moreover, for the 1G1D pixel drive architecture of the related art, when a color image is displayed, due to the influence of crosstalk factors, the chromaticity change of the display panel exceeds a predefined value more severely, resulting in lower quality of the display image.

This application mainly deal with not only low aperture ratio issues of the pixels in the 1G1D pixel-drive architecture in related skill and the low transmittance of the display panel, but also low quality issues of the chromaticity change of the display panel exceeds the predefined value when displaying color images due to the crosstalk factors.

SUMMARY OF THE INVENTION

The present application provides a display panel, a display terminal, and a method of manufacturing a display panel to increase the aperture ratio of the display panel, to increase the transmittance of the display panel, and to reduce the influence of crosstalk at the same time.

According to one aspect of this application, the present application provides a display panel including a control unit and a sub-pixel unit array, wherein the control unit includes a plurality of gate lines and a plurality of data lines, the sub-pixel unit array includes a plurality of sub-pixel units arranged in rows and columns, the sub-pixel unit array further includes one or more sub-pixel groups, each sub-pixel group includes at least two columns of the sub-pixel units, the plurality of data lines includes one or more data line groups, each data line group includes at least two data lines, the data line group corresponds to one of the sub-pixel group, and each data line group is arranged on any one column of the sub-pixel units of the corresponding sub-pixel group.

Moreover, in the display panel of the present application each row of the sub-pixel units comprises at least two gate lines arranged on one side of the row of the sub-pixel units, each row of the sub-pixel units is electrically connected to the at least two gate lines, each of the sub-pixel units is electrically connected to one of the plurality of data lines, and each of the sub-pixel groups is electrically connected to one of the data line group.

Moreover, in the display panel of the present application, the sub-pixel unit array includes a plurality of pixels, the plurality of pixels are arranged in rows and columns, and each pixel includes of the plurality of sub-pixel units with different types, and the sub-pixel units in a same column have a same type.

Moreover, in the display panel of the present application, each pixel includes a red sub-pixel unit, a blue sub-pixel unit, and a green sub-pixel unit.

Moreover, in the display panel of the present application, data signals on each data line include a positive signal and a negative signal, wherein polarities of the data signals on any two adjacent data lines in each data line group are different at a same moment, and wherein polarities of the data signals of any two adjacent sub-pixel units in the sub-pixel unit array receiving from the data lines respectively electrically connected to the sub-pixel units are different.

Moreover, in the display panel of the present application, each sub-pixel group includes at least two or more adjacent columns of the sub-pixel units, and types of any columns of the sub-pixel units of the sub-pixel group are different.

Moreover, in the display panel of the present application, each sub-pixel group includes at least two or more non-adjacent columns of sub-pixel units, and types of any two non-adjacent columns of the sub-pixel units of the sub-pixel group are the same.

Moreover, in the display panel of the present application, each sub-pixel unit is provided with a pixel electrode, and the pixel electrode includes a trunk electrode and a branch electrode disposed in a cross shape, the trunk electrode is arranged along a first direction and a second direction perpendicular to each other, and any data line in each data line group is parallel to the first direction of the trunk electrode.

Moreover, in the display panel of the present application, each data line group includes two data lines, the trunk electrode includes a first segment and a second segment, the first segment and the second segment are parallel to each other, and there is a gap between the first segment and the second segment, an orthographic projection of one of the two data lines in each data line group on the trunk electrode coincides with the first segment, and an orthographic projection of another data line in each data line group on the trunk electrode coincides with the second segment.

Moreover, in the present application, the display panel defining a first opening area greater than a second opening area, the first opening area includes an opening area of the sub-pixel unit provided with any data line group, and the second opening area includes an opening area of the sub-pixel unit without any data line group.

The present application further provides a display terminal, wherein the display terminal includes a terminal body and the display panel aforementioned, and the terminal body is connected to the display panel.

The present application further provides a method of manufacturing the aforementioned display panel, including: grouping the plurality of sub-pixel units of the sub-pixel unit array into the plurality of sub-pixel groups, wherein each of the sub-pixel groups includes at least two or more columns of the sub-pixel units; grouping the plurality of data lines into data line groups, wherein each of the data line groups includes at least two data lines; and arranging each of the data line groups on any columns of the sub-pixel units of the corresponding sub-pixel group.

Moreover, in the present application, the method of manufacturing the display panel further including: arranging at least two gate lines corresponding to each row of the sub-pixel unit on one side of the corresponding row of the sub-pixel unit, wherein each row of the sub-pixel units is electrically connected to the at least two gate lines, each of the sub-pixel unit is electrically connected to one of the plurality of data lines, and each of the sub-pixel groups is electrically connected to one of the data line groups.

Moreover, in the present application, the method of manufacturing the display panel further including: arranging the plurality of pixels of the sub-pixel unit array in rows and columns, wherein each pixel includes of the plurality of sub-pixel units with different types, and the sub-pixel units in the same column have the same type.

Moreover, in the present application, the method of manufacturing the display panel further including: dividing the data signals on each data line into the positive signal and the negative signal, wherein the polarities of the data signals on any two adjacent data lines in each data line group are different at the same moment, and polarities of the data signals of any two adjacent sub-pixel units in the sub-pixel unit array receiving from the data lines respectively electrically connected to the sub-pixel units are different.

Moreover, in the present application, the method of manufacturing the display panel further including: arranging each sub-pixel group comprising at least two or more adjacent columns of the sub-pixel units, wherein types of any columns of the sub-pixel units of the sub-pixel group are different.

Moreover, in the present application, the method of manufacturing the display panel further including: arranging each sub-pixel group comprising at least two or more non-adjacent columns of the sub-pixel units, wherein types of any non-adjacent columns of the sub-pixel units of the sub-pixel group are the same.

Moreover, in the present application, the method of manufacturing the display panel further including: providing a pixel electrode within each sub-pixel unit, wherein the pixel electrode includes a trunk electrode and a branch electrode disposed in a cross shape, the trunk electrode is arranged along a first direction and a second direction perpendicular to each other, and any data line in each data line group is parallel to the first direction of the trunk electrode.

Moreover, in the present application, the method of manufacturing the display panel further including: arranging each data line group including two data lines, wherein the trunk electrode includes a first segment and a second segment, the first segment and the second segment are parallel to each other, and there is a gap between the first segment and the second segment; wherein the orthographic projection of one of the two data lines in each data line group on the trunk electrode coincides with the first segment, and the orthographic projection of another data line in each data line group on the trunk electrode coincides with the second segment.

Moreover, in the present application, the method of manufacturing the display panel further including: arranging the first opening area of the display panel greater than a second opening area of the display panel, wherein the first opening area includes an opening area of the sub-pixel unit provided with any data line group, and the second opening area includes an opening area of the sub-pixel unit without any data line group.

According to the technical features of the application of the present invention: making each sub-pixel group includes at least two columns of the sub-pixel units, making each data line group includes at least two data lines; wherein, and making each data line group is arranged on one column of the sub-pixel units of the corresponding sub-pixel group, the present invention increases the aperture ratio of the display panel, increases the transmittance of the display panel, and reduces the influence of crosstalk at the same time.

BRIEF DESCRIPTION OF THE SEVERAL VIEWS OF THE DRAWINGS

The technical solutions and beneficial effects of the present application will be clearer by describing the specific implementation manners of the present application in detail with the accompanying drawings.

DETAILED DESCRIPTION OF SPECIFIC EMBODIMENTS OF THE INVENTION

In order to make purposes, technical solutions, and effects of the present application clearer and more specific, the present application is further described in detail below with reference to the accompanying drawings and examples. It should be understood that the specific embodiments described herein are only used to explain the present application, and are not used to limit the present application.

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

In the description of this application, it needs to be understood that the terms "center", "vertical", "horizontal", "length", "width", "thickness", "upper", "lower", "front", "rear", "left", "right", "vertical", "horizontal", "top", "bottom", "inner", "outer", "clockwise", "counterclockwise" and other directions or positional relationships, based on the orientation or positional relationship shown in the drawings, it is only for the convenience of describing the application and simplifying the description. rather than indicating or implying that the pointed device or element must have a specific orientation, be constructed and operated in a specific orientation. Therefore, it cannot be understood as a restriction on this application.

In addition, the terms "first" and "second" are only used for descriptive purposes and cannot be understood as indicating or implying relative importance or implicitly indicating the number of indicated technical features. Therefore, the features defined with "first" and "second" may explicitly or implicitly include one or more of the features. In the description of the present application, "multiple" means two or more than two, unless otherwise specifically defined.

In the description of this application, it should be noted that the terms "installed", "connected", and "connected" should be understood in a broad sense, unless otherwise clearly specified and limited. For example, it can be a fixed connection, a detachable connection, or an integral connection; it can be mechanically connected, or electrically connected, or can communicate with each other; it can be directly connected or indirectly connected through an intermediate medium; it can be a communication between two elements or an interaction relationship between two elements. For those of ordinary skill in the art, the specific meanings of the above-mentioned terms in this application can be understood according to specific circumstances.

The following disclosure provides many different embodiments or examples for realizing different structures of the present application. In order to simplify the disclosure of the present application, the components and settings of specific examples are described below. Of course, they are only examples, and the purpose is not to limit the application. In addition, the present application may repeat reference numerals and/or reference letters in different examples. Such repetition is for the purpose of simplification and clarity, and does not indicate the relationship between the various embodiments and/or settings discussed. In addition, this application provides examples of various specific processes and materials, but those of ordinary skill in the art may be aware of the application of other processes and/or the use of other materials. In some examples, the methods, means, elements, and circuits well known to those skilled in the art have not been described in detail, so as to highlight the gist of the present application.

Figure 1:
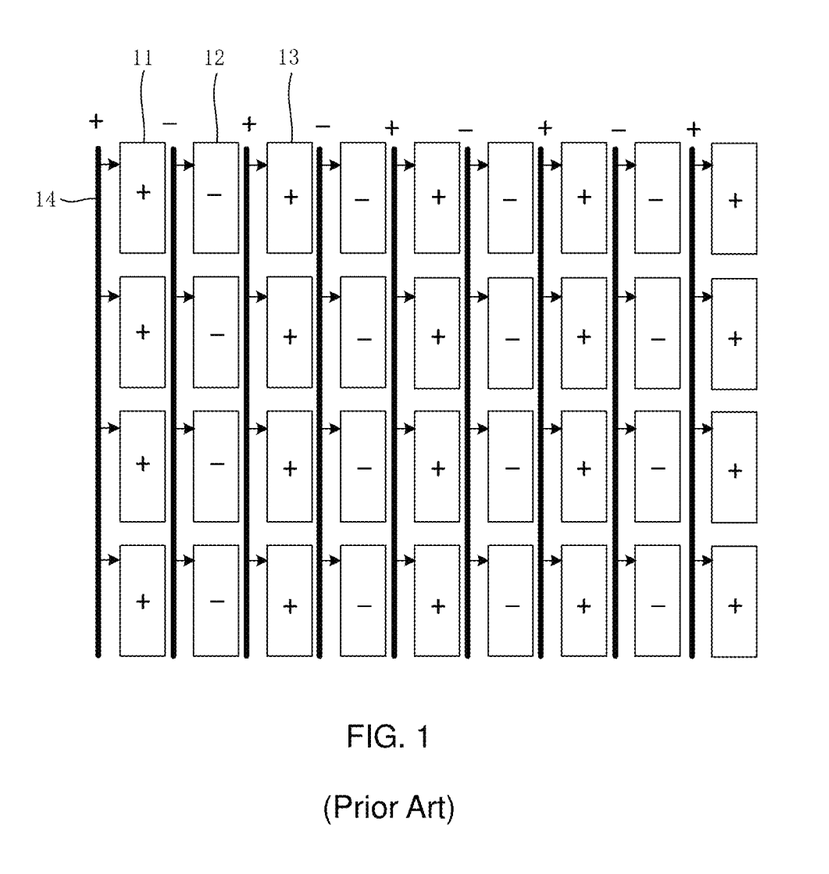
FIG. 1 shows a schematic diagram of a driving structure of the related display panel.

FIG. 1 shows a schematic diagram of a driving structure of the related display panel. As shown in FIG. 1, in the related art, the resolution of the display panel is 8K, and the drive architecture of the display panel is 1G1D. A gate line is arranged on one side of each row of sub-pixel units, and each row of sub-pixel units connects to a corresponding gate line; a data line is arranged on one side of each column of sub-pixel units, and each column of sub-pixel units connects to a corresponding data line.

In FIG. 1, the red sub-pixel unit 11, the green sub-pixel unit 12, and the blue sub-pixel unit 13 may form a pixel unit, and the data line 14 may be any data line of the display panel in the related art. The data line 14 is arranged on one side of a column of sub-pixel units or arranged between two columns of sub-pixel units.

Figure 2A:
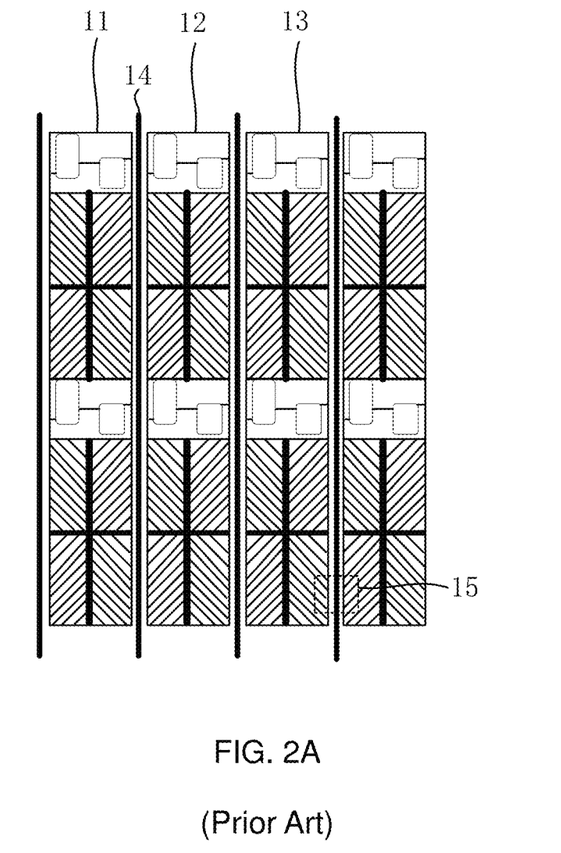
FIG. 2A shows a top view of a pixel unit of the related display panel.

FIG. 2A shows a top view of a pixel unit of the related display panel. As shown in FIG. 2A, in the related art, the pixel unit of the display panel may include a red sub-pixel unit 11, a green sub-pixel unit 12, and a blue sub-pixel unit 13; the data line 14 is arranged between the two sub-pixel units. The pixel unit of the display panel may be arranged on the array driving layer in the display panel.

In the related art, the display panel may be laminated and provided with a first substrate, an array driving layer, a liquid crystal layer, a common electrode layer, a color filter layer, and a second substrate in sequence. The array driving layer may include a pixel driving circuit, a pixel electrode, and an auxiliary electrode. The display panel forms a vertical electric field between the pixel electrode and the common electrode to arrange or rotate the liquid crystals in the liquid crystal layer appropriately, so that backlight could pass through the display panel to display.

Wherein, each pixel driving circuit may include a thin film transistor and a wiring, which are arranged above the corresponding pixel electrode, Each pixel electrode may include a trunk electrode and a branch electrode. The trunk electrode is in a shape of a cross, which is two straight lines intersect perpendicularly. The branch electrode can be electrically connected to the trunk electrode in a shape of an oblique stripe.

In FIG. 2A, the branch electrode is divided into four areas by the cross-shaped trunk electrode, and the direction of the inclination of the branch electrode in each area may be different. Each area corresponds to a display domain, and the liquid crystal molecules of each display domain have different alignment directions.

Figure 2B:
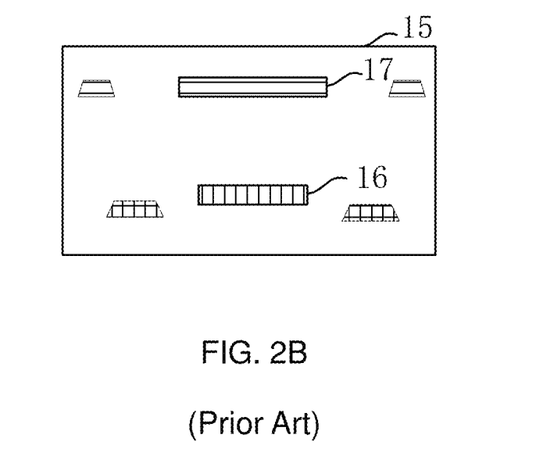
FIG. 2B shows a cross-sectional view of a pixel unit of a related display panel.

FIG. 2B shows a cross-sectional view of a pixel unit of a related art display panel. In FIG. 2A, the edge portions (for example, the dashed frame 15) of two pixel units are selected and enlarged to obtain a cross-sectional view of the pixel unit of the display panel in FIG. 2B.

It could be noted that a data line 16 (Data line) is provided in the gap between the two pixel units; a shield electrode 17 (ie, DBS) is provided directly above the data line with Indium-Tin-Oxide (ie, ITO) material to reduce the influence of the electric field between the data line on the array drive layer and part of the common electrode on the liquid crystal layer and to avoid from the light-leaking. On both sides of the data line and on both sides of the DBS shielding electrode, other types of electrodes can also be set according to the preset distance parameter (in micrometers). In FIG. 2A, the pixel aperture ratio is 51.19%.

Figure 3:
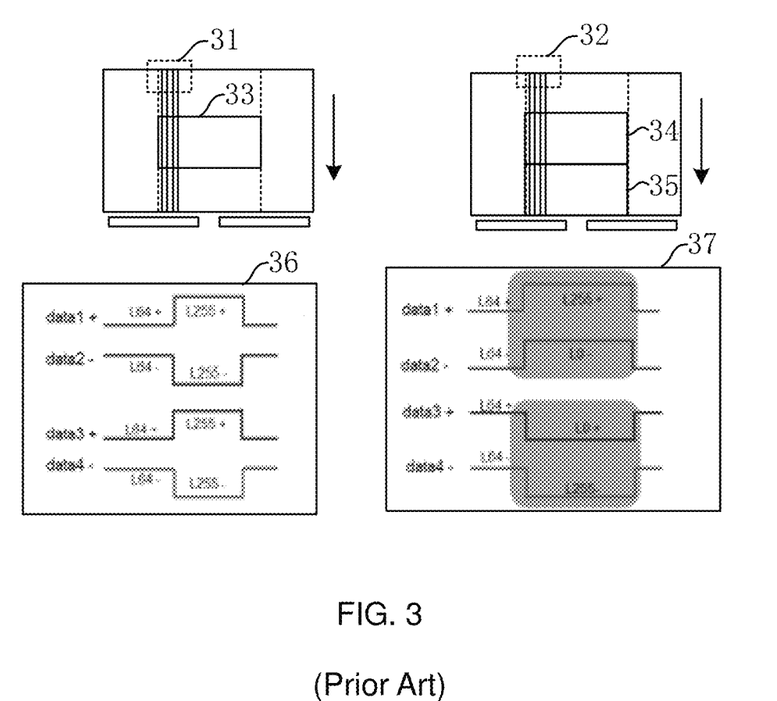
FIG. 3 shows a schematic diagram of a related crosstalk test.

FIG. 3 shows a schematic diagram of a related crosstalk test. As shown in FIG. 3, based on the 1G1D architecture of FIG. 1 and FIG. 2A, the crosstalk existing in the display panel can be tested. Wherein, in FIG. 3, both dotted block 31 and 32 show four data lines, showed as data1-data4. The pixel unit 33 represents a white pixel unit, performing according to the four data lines of dotted block 31. The pixel unit 34 represents a blue pixel unit (that is, the upper pixel unit), and the pixel unit 35 represents a green pixel unit (that is, the lower pixel unit), performing according to the four data lines of dotted block 32. The scanning direction is progressively scanned from top to bottom, and the gray scale is 64 (that is, L64).

Referring to the waveform 36 in FIG. 3, for the white pixel unit (the white frame), the waveform on the data line data1 and the waveform on the data line data2 are always opposite in polarity; that is, when the data line data1 is at a high level, the data line data2 is at a low level; when the data line data1 is at a low level, the data line data2 is at a high level. At this time, for each pixel, the coupling capacitance effect formed between the pixel and the data lines on both sides of the pixel could be canceled each other and reduce the crosstalk influence.

Also referring to the waveform 37 in FIG. 3, for the blue pixel unit (the blue frame), the waveform on the data line data1 and the waveform on the data line data2 have the same in polarity; that is, when the data line data1 is at a high level, the data line data2 is also at a high level; when the data line data1 is at a low level, the data line data2 is also at a low level. At this time, for each pixel, the coupling capacitance effect formed between the pixel and the data lines on both sides of the pixel could be superimposed each other and enhance the crosstalk influence.

It should be noted that the white box on the left in FIG. 3 may be the test result under the normal display of the display panel (ie, black and white display), and the blue box on the right in FIG. 3 may be the test result under the color display of the display panel. Therefore, the crosstalk test results are not ideal whether it is 64 gray scales or 255 gray scales, which causes the chromaticity and other parameters of the display panel to also exceed the predefined range.

In view of this, the present application provides a display panel, which includes a control unit and a sub-pixel unit array, the control unit includes a plurality of gate lines and a plurality of data lines, and the sub-pixel unit array includes a plurality of sub-pixel units arranged in rows and columns, wherein the sub-pixel unit array includes at least one or more sub-pixel groups, and each sub-pixel group includes at least two columns of the sub-pixel units; and the data lines includes at least one or more data line group, and each data line group includes at least two data lines; wherein each data line group corresponds to one of the sub-pixel groups, and each data line group is arranged on one column of the sub-pixel units of the corresponding sub-pixel group.

According to the technical features of the application of the present invention: making each sub-pixel group includes at least two columns of the sub-pixel units, making each data line group includes at least two data lines; wherein, and making each data line group is arranged on one column of the sub-pixel units of the corresponding sub-pixel group, the present invention increases the aperture ratio of the display panel, increases the transmittance of the display panel, and reduces the influence of crosstalk at the same time.

Figure 4:
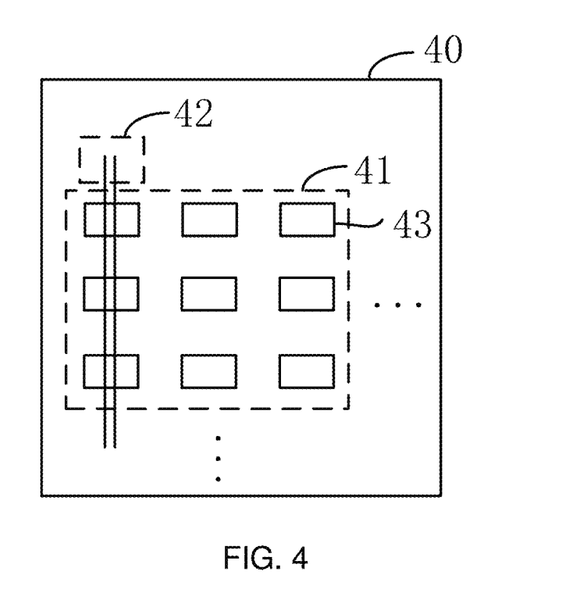
FIG. 4 shows a schematic diagram of a display panel according to an embodiment of the present application.

FIG. 4 shows a schematic diagram of a display panel according to an embodiment of the present application. As shown in FIG. 4, the display panel 40 includes a control unit and a sub-pixel unit array 41. The sub-pixel unit 43 may be any sub-pixel unit in the sub-pixel unit array 41.

For detailed description, the following embodiment of the present application takes the leftmost column of sub-pixel units as the first column of sub-pixel units, and the uppermost row of sub-pixel units as the first row of sub-pixel units. The sub-pixel unit located in the first row and the first column can be denoted as sub-pixel unit (1,1), and so on.

Further, the sub-pixel unit array includes at least one or more sub-pixel groups, and each sub-pixel group includes at least two columns of sub-pixel units. For example, in FIG. 4, one sub-pixel group may include a first column of sub-pixel units and a second column of sub-pixel units. Of course, a sub-pixel group may also include the first column of sub-pixel units, the second column of sub-pixel units, and the third column of sub-pixel units. It can be understood that the present application does not limit the number of columns of sub-pixel units in each sub-pixel group.

Further, the plurality of data lines includes at least one or more data line groups, and each data line group includes at least two data lines. For example, in FIG. 4, the data line group 42 may include two data lines to provide data signals for the first column of sub-pixel units and the second column of sub-pixel units. Of course, the data line group 42 may also include three data lines to provide data signals for the first column of sub-pixel units, the second column of sub-pixel units, and the third column of sub-pixel units. It can be understood that the present application does not limit the number of data lines in each data line group.

Moreover, each data line group corresponds to a sub-pixel group, and each data line group is arranged on any column of sub-pixel units in the corresponding sub-pixel group; that is, all the data lines in each data line group may be located directly above any column of sub-pixel units in the sub-pixel group corresponding to the data line group. For example, the data line group 42 may correspond to a sub-pixel group composed of the first column of sub-pixel units and the second column of units, hence, the data line group 42 may be arranged above the first column of sub-pixel units or the second column of sub-pixel units. Of course, one of the data lines in the data line group 42 may be arranged above the first column of sub-pixel units, and the other data line in the data line group 42 may be arranged above the second column of sub-pixel units.

Further, the sub-pixel unit array includes a plurality of pixels, and the pixels are arranged in rows and columns. Also, each pixel includes a plurality of different types of sub-pixel units, wherein the types of sub-pixel units located in the same column are the same. For example, each pixel may include a red sub-pixel unit, a blue sub-pixel unit, and a green sub-pixel unit. In FIG. 4, the sub-pixel units in the first column may be red sub-pixel units, the sub-pixel units in the second column may be blue sub-pixel units, and the sub-pixel units in the third column may be green sub-pixel units. One pixel may include a sub-pixel unit (1, 1), a sub-pixel unit (1,2), and a sub-pixel unit (1, 3).

Furthermore, one side of each row of sub-pixel units is provided with at least two gate lines corresponding to the row of sub-pixel units, and each row of sub-pixel units electrically connects to the at least two corresponding gate lines. For example, in FIG. 4, on one side of the first row of sub-pixel units, two gate lines may be provided to jointly control the operation state of the thin film transistors of each sub-pixel unit in the first row of sub-pixel units. For example, in the first row of sub-pixel units, all red sub-pixel units may electrically connect to one of the two gate lines corresponding to the row of sub-pixel units, also all the blue sub-pixel units and all the green sub-pixel units may electrically connect to the other gate line of the two gate lines corresponding to the row of sub-pixel units.

Further, each sub-pixel unit is electrically connected to one of the plurality of data lines; that is, each sub-pixel unit is provided with a data line that is electrically connected to the sub-pixel unit. When the scan signal on the gate line electrically connected to the sub-pixel unit turns on the thin film transistor in the sub-pixel unit, the data signal on the data line electrically connects to the sub-pixel unit is sent to the sub-pixel unit, so that the display panel displays.

Further, each sub-pixel group is electrically connected to one data line group in the at least one or more data line groups; that is, each sub-pixel group can be electrically connected to a corresponding data line group, so all data lines in each data line group are used to provide data signals for all sub-pixel units in the sub-pixel group which corresponds to the data line group.

Further, the data signal on each data line includes a positive signal and a polarity signal, wherein the data signals, at the same time, on any two adjacent data lines in each data line group are different in polarity. Also, the data signals received by any two adjacent sub-pixel units in the sub-pixel unit array from the data lines electrically connected to the respective sub-pixel units are different in polarity. For example, the positive signal may be a high level signal, and the negative signal. The data signal loaded on each data line can be preconfigured.

Figure 5:
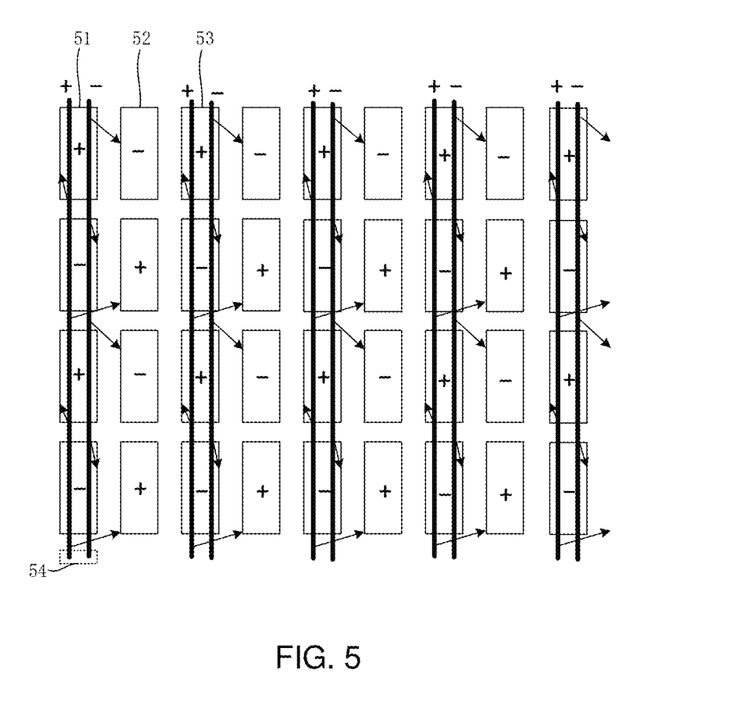
FIG. 5 shows a schematic diagram of a driving architecture of the first display panel according to an embodiment of the present application.

FIG. 5 shows a schematic diagram of a driving architecture of the first display panel according to an embodiment of the present application. As shown in FIG. 5, one pixel unit may include a red sub-pixel unit 51, a blue sub-pixel unit 52, and a green sub-pixel unit 53, and the data line group 54 is arranged on the first column of sub-pixel units.

Further, each sub-pixel group includes at least two adjacent columns of sub-pixel units, and each column of sub-pixel units in each sub-pixel group has different types of sub-pixel unit. For example, in FIG. 5, a sub-pixel group may include a first column of sub-pixel units and a second column of sub-pixel units; the two data lines in the data line group 54 are used to provide data signals for the first column of sub-pixel units and the second column of sub-pixel units.

Wherein, the two data lines in the data line group include a data line loaded with a positive signal and a data line loaded with a negative signal. The data line loaded with positive signals can load positive signals to positive sub-pixel units in not only the first column but also the second column of sub-pixel units; similarly, the data line loaded with negative signals can load negative signals to negative sub-pixel units in not only the first column but also the second column of sub-pixel units.

Figure 6:
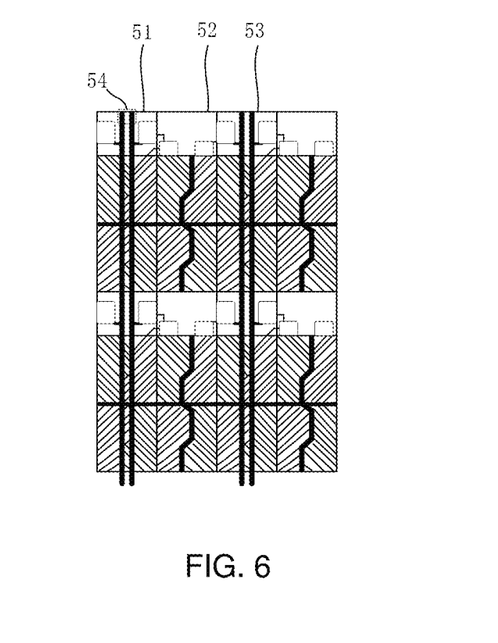
FIG. 6 shows a schematic diagram of a pixel unit of a first display panel according to an embodiment of the present application.

FIG. 6 shows a schematic diagram of a pixel unit of a first display panel according to an embodiment of the present application; in other words, FIG. 6 is based on the driving architecture of the first display panel of FIG. 5 to set up the pixel units. Wherein, each sub-pixel unit is provided with a pixel electrode, and the pixel electrode includes a trunk electrode and a branch electrode in a cross shape; the trunk electrode is arranged along a first direction and a second direction that are perpendicular to each other, and one data line in each data line group is parallel to the first direction of the trunk electrode.

Further, in FIG. 6, the first direction may be a vertical direction, and the second direction may be a horizontal direction. In the second direction, the shape of the trunk electrode may be a straight line; in the first direction, the shape of the trunk electrode may be a bending curve.

Further, each data line group includes two data lines. The trunk electrode includes a first segment and a second segment, the first segment and the second segment are parallel to each other, and there is a gap between the first segment and the second segment. In FIG. 6, the first segment and the second segment may be connected by an inclined fold line.

Further, the orthographic projection of one of the data lines in each data line group on the trunk electrode coincides with the first segment; the orthographic projection of another data line in each data line group on the trunk electrode coincides with the second segment.

Figure 7:
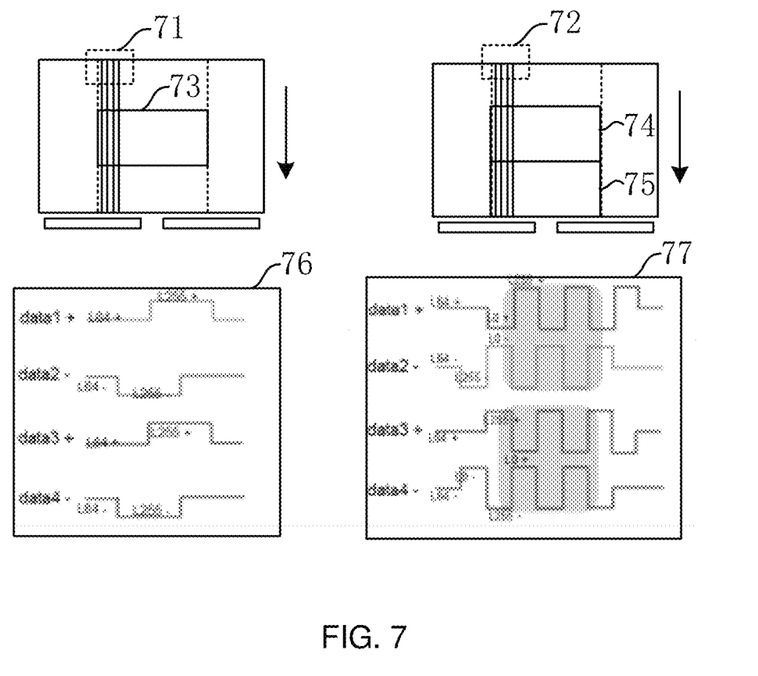
FIG. 7 shows a schematic diagram of the first crosstalk test according to an embodiment of the present application.

FIG. 7 shows a schematic diagram of the first crosstalk test according to an embodiment of the present application. In other words, FIG. 7 shows the crosstalk test is performed based on the driving architecture of the first display panel of FIG. 5.

Both dotted block 71 and dotted block 72 in FIG. 7 show the four data lines in the architecture of FIG. 5, and the four data lines may be arranged on both sides of the unit of the sub-pixel in the same column. Also, FIG. 7 discloses a white frame 73, a blue frame 74, and a green frame 75. The other parts in FIG. 7 are similar to those in FIG. 3 so not be described in detail again.

See FIG. 7, which used the drive architecture in FIG. 5, for the waveform 76 corresponding to the white frame 73, the signals on the data line data and the data line data2 are mostly opposite in polarity; for the waveform 77 corresponding to the blue frame 74, the signal of the data line data1 and the data line data2 in the shaded part are completely opposite in polarity, and the signal of the other parts are mostly opposite in polarity. The data line data3 and the data line data4 are similar to the data line data1 and the data line data2. Therefore, using the driving architecture in FIG. 5, for each pixel, the coupling capacitance between the pixel and the data lines on both sides of the pixel cancels each other out, reducing crosstalk influences.

Figure 8:
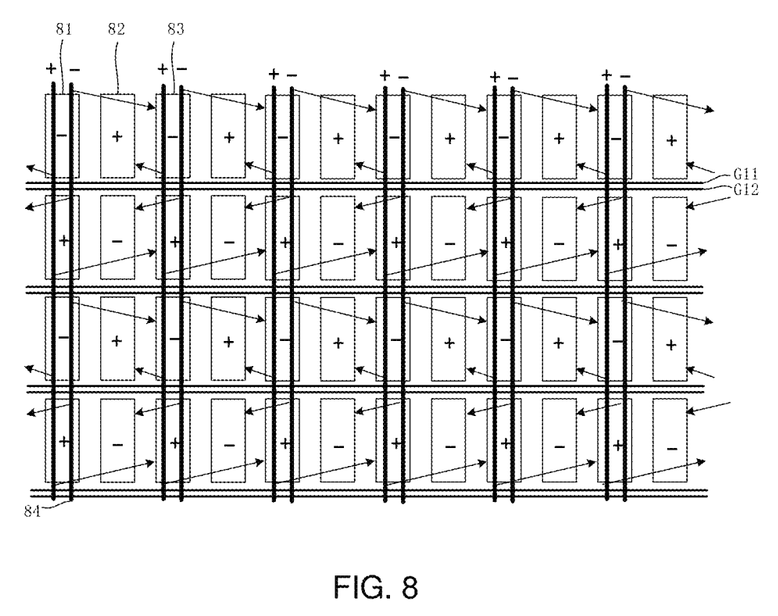
FIG. 8 shows a schematic diagram of a driving architecture of a second display panel according to an embodiment of the present application.

FIG. 8 shows a schematic diagram of a driving architecture of a second display panel according to an embodiment of the present application. As shown in FIG. 8, one pixel unit may include a red sub-pixel unit 81, a blue sub-pixel unit 82, and a green sub-pixel unit 83, and the data line group 84 is arranged on the first column of sub-pixel units.

Further, each sub-pixel group includes at least two non-adjacent columns of sub-pixel units, and columns of sub-pixel units in the same sub-pixel group are the same type. For example, in FIG. 8, a sub-pixel group may include a second column of sub-pixel units and a fifth column of sub-pixel units, and the second column of sub-pixel units and the fifth column of sub-pixel units are both blue sub-pixel units. The two data lines in the data line group arranged on the third column of sub-pixel units are used to provide data signals for the second column of sub-pixel units and the fifth column of sub-pixel units.

Wherein, the two data lines in the data line group include a data line loaded with a positive signal and a data line loaded with a negative signal. The data line for loading the positive signal may load the positive signal for the sub-pixel unit that needs to be loaded with the positive signal not only of the second column but also of the fifth column of sub-pixel units. Similarly, the data line for loading the negative signal may load the negative signal for the sub-pixel unit that needs to be loaded with the negative signal not only of the second column but also of the fifth column of sub-pixel units.

It should be noted that, regardless of the architecture in FIG. 5 or the architecture in FIG. 8, at least two gate lines corresponding to the row of sub-pixel units may be provided on one side of each row of sub-pixel units, and each row of sub-pixel units electrically connects to at least two corresponding gate lines. For example, in FIG. 8, gate line G11 and gate line G12 may arrange between the first row and the second row of sub-pixel units. Two gate lines corresponding to the row of sub-pixel units are arranged on one side of each row of sub-pixel units. Wherein the sub-pixel unit loaded with a positive signal in the row of sub-pixel units electrically connects to one of the corresponding two gate lines, in the other hand, the sub-pixel unit loaded with a negative signal in the row of sub-pixel units electrically connect to the other gate line of the two corresponding gate lines.

Figure 9:
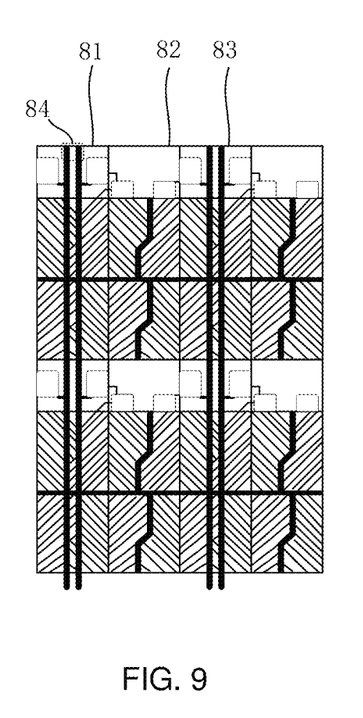
FIG. 9 shows a schematic diagram of a pixel unit of a second type of display panel according to an embodiment of the present application.

FIG. 9 shows a schematic diagram of a pixel unit of a second type of display panel according to an embodiment of the present application. In other words, FIG. 9 shows the one pixel unit is arranged based on the driving architecture of the second display panel of FIG. 8. It can be seen that the arrangement of the pixel unit and the data lines in the data line group in FIG. 9 is similar to that in FIG. 6, so will not be repeated.

Further, the display panel includes a first opening area of the display panel and a second opening area of the display panel, and the first opening area is larger than the second opening area. Wherein the first opening area includes an opening area of the sub-pixel unit provided with any data line group, and the second opening area includes an opening area of the sub-pixel unit provided without any data line group. In addition, the data line grouping in the embodiment of the present application is arranged on one column of sub-pixel units instead of between two columns of sub-pixel units.

Therefore, whether it is based on the architecture of FIG. 5 or FIG. 8, the opening area of the sub-pixel unit provided with any data line group can be appropriately increased to increase the opening ratio of the display panel. Compared with the aperture ratio of the structure of FIG. 1 in the related art, the structure of FIG. 5 or FIG. 8 could increase the aperture ratio by at least 12%.

It should be noted that in the first architecture and the second architecture of the embodiments of the present application, there is no need to provide a DBS shield electrode above any data line group, therefore, the lateral size of the opening area can be further increased, thereby increasing the effective opening ratio and improving the driving efficiency of the liquid crystal.

Figure 10:
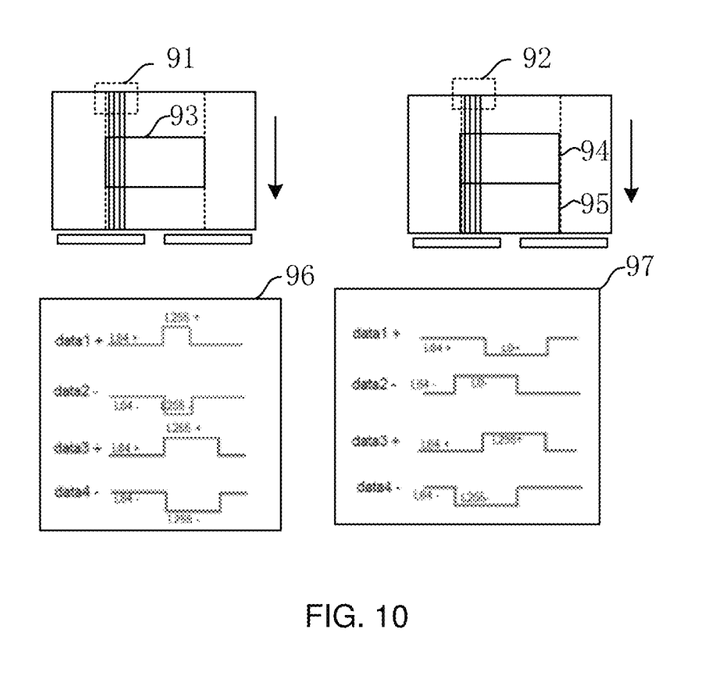
FIG. 10 shows a schematic diagram of a second crosstalk test according to an embodiment of the present application.

FIG. 10 shows a schematic diagram of a second crosstalk test according to an embodiment of the present application. In the other word, FIG. 10 shows the crosstalk test is performed based on the driving architecture of the second display panel of FIG. 8. The dotted block 91 and dotted block 92 in FIG. 10 both show the four data lines in the architecture of FIG. 8. And FIG. 10 reveals a white frame 93, a blue frame 94, and a green frame 95. The other parts in FIG. 10 are similar to those in FIG. 7 and will not be described in detail again.

Refer to FIG. 10, using the drive architecture in FIG. 5, for the waveform 96 corresponding to the white frame 93, the signal on the data line data1 and the data line data2 are completely opposite in polarity; for the waveform 97 corresponding to the blue frame 94, the signal of the data line data1 and the data line data2 are mostly opposite in polarity. The data line data3 and the data line data4 are similar to the data line data1 and the data line data2.

Therefore, using the driving architecture in FIG. 8, for each pixel, the effects of the coupling capacitor formed between the pixel and the data lines located on both sides of the pixel cancel each other out, reducing the influence of crosstalk. It should be noted that, as FIG. 7 and FIG. 10 show, the crosstalk test results in FIG. 7 and FIG. 10 are different because of different driving modes and driving architectures. In actual applications, the drive architecture and drive method could be selected according to actual needs; this application is not limited.

The present application also provides a display terminal. The display terminal includes a terminal main body and the display panel, and the terminal main body is connected to the display panel.

To sum up, according to the technical features of the application of the present invention: making each sub-pixel group includes at least two columns of the sub-pixel units, making each data line group includes at least two data lines; wherein, and making each data line group is arranged on one column of the sub-pixel units of the corresponding sub-pixel group, the present invention increases the aperture ratio of the display panel, increases the transmittance of the display panel, and reduces the influence of crosstalk at the same time.

The display panel, the display terminal, and the method of manufacturing the display panel provided by the embodiments of the present application have been described in detail above. Specific examples are used in this article to illustrate the principles and implementations of the application. The description of the above examples is only used to help understand the technical solutions and core ideas of the application. Those of ordinary skill in the art should understand that it can still modify the technical solutions described in the foregoing embodiments, or equivalently replace some of the technical features; however, these modifications or replacements do not cause the essence of the corresponding technical solutions to deviate from the scope of the technical solutions of the embodiments of the present application.

It can be understood that those having ordinary skills in the art may easily contemplate various changes and modifications of the technical solution and technical ideas of the present application and all these changes and modifications are considered within the protection scope of right for the present application.

What is claimed is:

1. A display panel, comprising a control unit and a sub-pixel unit array, wherein the control unit comprises a plurality of gate lines and a plurality of data lines, and the sub-pixel unit array comprises a plurality of sub-pixel units arranged in rows and columns;

the sub-pixel unit array further comprises one or more sub-pixel groups, and each sub-pixel group comprises at least two columns of the sub-pixel units;

the plurality of data lines comprise one or more data line groups, and each data line group comprises at least two data lines;

each data line group corresponds to one of the sub-pixel groups, and each data line group is arranged directly above one column of the at least two columns of the sub-pixel units of the corresponding sub-pixel group; and at least one column of the sub-pixel units in the corresponding sup-pixel group excludes being positioned under any data line group, and each data line group serves multiple columns of the sub-pixel units in the corresponding sub-pixel group.

2. The display panel according to claim 1, wherein each row of the sub-pixel units comprises at least two gate lines arranged on one side of the row of the sub-pixel units, each row of the sub-pixel units is electrically connected to the at least two gate lines, each of the sub-pixel units is electrically connected to one of the plurality of data lines, and each of the sub-pixel groups is electrically connected to one of the data line groups.

3. The display panel according to claim 2, wherein the sub-pixel unit array comprises a plurality of pixels, the plurality of pixels are arranged in rows and columns, each pixel comprises the plurality of sub-pixel units with different types, and the sub-pixel units in a same column have a same type.

4. The display panel according to claim 3, wherein each pixel comprises a red sub-pixel unit, a blue sub-pixel unit, and a green sub-pixel unit.

5. The display panel according to claim 3, wherein data signals on each data line comprise a positive signal and a negative signal, wherein polarities of the data signals on any two adjacent data lines in each data line group are different at a same moment, and wherein polarities of the data signals of any two adjacent sub-pixel units in the sub-pixel unit array receiving from the data lines respectively electrically connected to the sub-pixel units are different.

6. The display panel according to claim 4, wherein each sub-pixel group comprises at least two or more adjacent columns of the sub-pixel units, and types of any columns of the sub-pixel units of the sub-pixel group are different.

7. The display panel according to claim 4, wherein each sub-pixel group comprises at least two or more non-adjacent columns of sub-pixel units, and types of any non-adjacent columns of the sub-pixel units of the sub-pixel group are the same.

8. The display panel according to claim 4, wherein each sub-pixel unit is provided with a pixel electrode, and the pixel electrode comprises a trunk electrode and a branch electrode disposed in a cross shape, and wherein the trunk electrode is arranged along a first direction and a second direction perpendicular to each other, and any data line in each data line group is parallel to the first direction of the trunk electrode.

9. The display panel according to claim 8, wherein each data line group comprises two data lines, and wherein the trunk electrode comprises a first segment and a second segment, the first segment and the second segment are parallel to each other, and there is a gap between the first segment and the second segment; and
wherein an orthographic projection of one of the two data lines in each data line group on the trunk electrode coincides with the first segment, and an orthographic projection of another data line in each data line group on the trunk electrode coincides with the second segment.

10. The display panel according to claim 1, defining a first opening area greater than a second opening area wherein the first opening area comprises an opening area of the sub-pixel unit provided with any data line group, and the second opening area comprises an opening area of the sub-pixel unit without any data line group.

11. A display terminal, wherein the display terminal comprises a terminal body and a display panel, and the terminal body is connected to the display panel, wherein display panel comprises a control unit and a sub-pixel unit array, wherein the control unit comprises a plurality of gate lines and a plurality of data lines, and the sub-pixel unit array comprises a plurality of sub-pixel units arranged in rows and columns;
the sub-pixel unit array further comprises one or more sub-pixel groups, and each sub-pixel group comprises at least two columns of the sub-pixel units;
the plurality of data lines comprise one or more data line groups, and each data line group comprises at least two data lines;
each data line group corresponds to one of the sub-pixel groups, and each data line group is arranged directly above one column of the at least two columns of the sub-pixel units of the corresponding sub-pixel group; and
at least one column of the sub-pixel units in the corresponding sup-pixel group excludes being positioned under any data line group, and each data line group serves multiple columns of the sub-pixel units in the corresponding sub-pixel group.

12. A method of manufacturing a display panel, wherein display panel comprises a control unit and a sub-pixel unit array, wherein the control unit comprises a plurality of gate lines and a plurality of data lines, and the sub-pixel unit array comprises a plurality of sub-pixel units arranged in rows and columns;
the sub-pixel unit array further comprises one or more sub-pixel groups, and each sub-pixel group comprises at least two columns of the sub-pixel units;
the plurality of data lines comprise one or more data line groups, and each data line group comprises at least two data lines;
each data line group corresponds to one of the sub-pixel groups, and each data line group is arranged directly above one column of the at least two columns of the sub-pixel units of the corresponding sub-pixel group; and
at least one column of the sub-pixel units in the corresponding sup-pixel group excludes being positioned under any data line group, and each data line group serves multiple columns of the sub-pixel units in the corresponding sub-pixel group,
wherein the method of manufacturing the display panel comprises:
grouping the plurality of sub-pixel units of the sub-pixel unit array into the plurality of sub-pixel groups, wherein each of the sub-pixel groups comprises at least two or more columns of the sub-pixel units;
grouping the plurality of data lines into data line groups, wherein each of the data line groups comprises at least two data lines; and
arranging each of the data line groups on any column of the sub-pixel units of the corresponding sub-pixel group.

13. The method of manufacturing the display panel according to claim 12, further comprising:
arranging at least two gate lines corresponding to each row of the sub-pixel unit on one side of the corresponding row of the sub-pixel unit, wherein each row of the sub-pixel units is electrically connected to the at least two gate lines, each of the sub-pixel units is electrically connected to one of the plurality of data lines, and each of the sub-pixel groups is electrically connected to one of the data line groups.

14. The method of manufacturing the display panel according to claim 13, further comprising:
arranging the plurality of pixels of the sub-pixel unit array in rows and columns, wherein each pixel comprises the plurality of sub-pixel units with different types, and the sub-pixel units in the same column have the same type.

15. The method of manufacturing the display panel according to claim 13, further comprising:
dividing the data signals on each data line into the positive signal and the negative signal, wherein the polarities of the data signals on any two adjacent data lines in each data line group are different at the same moment, and polarities of the data signals of any two adjacent sub-pixel units in the sub-pixel unit array receiving from the data lines respectively electrically connected to the sub-pixel units are different.

16. The method of manufacturing the display panel according to claim 14, further comprising:
arranging each sub-pixel group comprising at least two or more adjacent columns of the sub-pixel units, wherein types of any columns of the sub-pixel units of the sub-pixel group are different.

17. The method of manufacturing the display panel according to claim 14, further comprising:
arranging each sub-pixel group comprising at least two or more non-adjacent columns of the sub-pixel units, wherein types of any non-adjacent columns of the sub-pixel units of the sub-pixel group are the same.

18. The method of manufacturing the display panel according to claim 14, further comprising:
providing a pixel electrode within each sub-pixel unit, wherein the pixel electrode comprises a trunk electrode and a branch electrode disposed in a cross shape, the trunk electrode is arranged along a first direction and a second direction perpendicular to each other, and any data line in each data line group is parallel to the first direction of the trunk electrode.

19. The method of manufacturing the display panel according to claim 18, further comprising:
arranging each data line group comprising two data lines, wherein the trunk electrode comprises a first segment and a second segment, the first segment and the second segment are parallel to each other, and there is a gap between the first segment and the second segment; and
wherein the orthographic projection of one of the two data lines in each data line group on the trunk electrode coincides with the first segment, and the orthographic projection of another data line in each data line group on the trunk electrode coincides with the second segment.

20. The method of manufacturing the display panel according to claim 12, further comprising: arranging the first opening area of the display panel greater than the second opening area of the display panel, wherein the first opening area comprises an opening area of the sub-pixel unit provided with any data line group, and the second opening area comprises an opening area of the sub-pixel unit without any data line group.

* * * * *